(12) United States Patent
Moshayedi (10) Patent No.: US 9,311,006 B2
(45) Date of Patent: Apr. 12, 2016

(54) TABLE JOURNALING IN FLASH STORAGE DEVICES

(75) Inventor: Mark Moshayedi, Newport Coast, CA (US)

(73) Assignee: HGST TECHNOLOGIES SANTA ANA, INC., Santa Ana, CA (US)

( * ) Notice: Subject to any disclaimer, the term of this patent is extended or adjusted under 35 U.S.C. 154(b) by 344 days.

(21) Appl. No.: 12/492,104

(22) Filed: Jun. 25, 2009

(65) Prior Publication Data

US 2009/0327589 A1 Dec. 31, 2009

Related U.S. Application Data

(60) Provisional application No. 61/075,709, filed on Jun. 25, 2008.

(51) Int. Cl.
| | |
|---|---|
| *G06F 12/00* | (2006.01) |
| *G06F 12/02* | (2006.01) |
| *G06F 12/16* | (2006.01) |
| *G06F 3/06* | (2006.01) |
| *G06F 11/14* | (2006.01) |

(52) U.S. Cl.
CPC ............ *G06F 3/0613* (2013.01); *G06F 3/0659* (2013.01); *G06F 3/0688* (2013.01); *G06F 11/1441* (2013.01)

(58) Field of Classification Search
CPC .............. G06F 12/0246; G06F 3/0679; G06F 2212/7207; G06F 2212/7201; G06F 2212/7202
USPC ......................................................... 711/103
See application file for complete search history.

(56) References Cited

U.S. PATENT DOCUMENTS

| | | | | |
|---|---|---|---|---|
| 5,845,313 A | * | 12/1998 | Estakhri et al. ............... | 711/103 |
| 5,905,993 A | * | 5/1999 | Shinohara ..................... | 711/103 |
| 6,449,625 B1 | * | 9/2002 | Wang | |
| 6,711,663 B2 | * | 3/2004 | Lai et al. ....................... | 711/206 |
| 6,799,268 B1 | | 9/2004 | Boggs et al. | |
| 6,938,116 B2 | * | 8/2005 | Kim et al. ..................... | 711/103 |
| 6,938,140 B2 | * | 8/2005 | Louie et al. ................... | 711/165 |
| 7,076,599 B2 | | 7/2006 | Aasheim et al. | |
| 7,139,883 B2 | | 11/2006 | Aasheim et al. | |
| 7,529,880 B2 | * | 5/2009 | Chung et al. .................. | 711/103 |
| 7,620,961 B2 | * | 11/2009 | Aasheim et al. .............. | 719/328 |
| 7,979,626 B2 | * | 7/2011 | Rogers et al. ................. | 711/103 |
| 8,234,457 B2 | * | 7/2012 | Lubbers et al. ............... | 711/143 |

(Continued)

OTHER PUBLICATIONS

Dai et al., "ELF: An Efficient Log-Structured Flash File System for Micro Sensor Nodes", SenSys '04, Nov. 3-5, 2004, pp. 176-187, Baltimore, Maryland.

(Continued)

*Primary Examiner* — Yaima Rigol
(74) *Attorney, Agent, or Firm* — McDermott Will & Emery LLP (57) ABSTRACT

A method of table journaling in a flash storage device comprising a volatile memory and a plurality of non-volatile data blocks is provided. The method comprises the steps of creating a first copy in a first one or more of the plurality of non-volatile data blocks of an addressing table stored in the volatile memory, writing transaction log data to a second one or more of the plurality of non-volatile data blocks, and updating the first copy of the addressing table based on changes to the addressing table stored in the volatile memory after the second one or more of the plurality of non-volatile data blocks have been filled with transaction log data.

19 Claims, 5 Drawing Sheets

(56) References Cited

U.S. PATENT DOCUMENTS

| | | |
|---|---|---|
| 2004/0186946 A1* | 9/2004 | Lee ............................... 711/103 |
| 2007/0022263 A1* | 1/2007 | Fandel et al. .................. 711/162 |
| 2008/0098192 A1 | 4/2008 | Im et al. |
| 2009/0113121 A1* | 4/2009 | Lee et al. ...................... 711/103 |
| 2009/0157950 A1 | 6/2009 | Selinger |
| 2009/0172262 A1 | 7/2009 | Olbrich et al. |

OTHER PUBLICATIONS

Wu et al., "Efficient Initialization and Crash Recovery for Log-based File Systems over Flash Memory", SAC '06, Apr. 23-27, 2006, pp. 896-900, Dijon, France.

* cited by examiner

TABLE JOURNALING IN FLASH STORAGE DEVICES

CROSS-REFERENCE TO RELATED APPLICATION

The present application claims the benefit of priority under 35 U.S.C. §119 from U.S. Provisional Patent Application Ser. No. 61/075,709, entitled "SOLID STATE DEVICE," filed on Jun. 25, 2008, the disclosure of which is hereby incorporated by reference in its entirety for all purposes.

FIELD OF THE INVENTION

The present invention relates to flash storage devices and, in particular, relates to table journaling in flash storage devices.

BACKGROUND OF THE INVENTION

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

In addition to non-volatile flash memory, many flash storage devices include a controller and volatile memory, such as DRAM, which are used in the management of the read and write operations of the flash storage devices and in the communication between the flash storage devices and the host devices to which they are connected. For example, DRAM may contain an addressing table correlating logical addresses used by the host device with physical addresses in the non-volatile flash memory where data is stored. Because many flash storage devices are dependent upon a host device to which they are connected for power, the sudden and unexpected loss of power (e.g., due to the flash storage device being unplugged from the host) is a regrettably common circumstance. When this occurs, the information stored in the volatile memory of a flash storage device may be lost, which can result in data corruption or an undue delay in recreating the addressing table upon the restoration of power. To address this problem, many flash storage devices include mechanisms for providing enough emergency power to provide time for the addressing table(s) to be copied to the non-volatile flash memory. These mechanisms, such as super-capacitors, batteries and the like, may dramatically increase the cost and complexity of the flash storage devices that employ them, and should they eventually wear out or otherwise fail, an unintended power interruption may result in data loss or necessitate rebuilding addressing tables from scratch.

SUMMARY OF THE INVENTION

Various aspects of the subject disclosure solve the foregoing problem by providing table journaling for flash storage devices. The table journaling allows a flash storage device to recover quickly from a loss of power without data corruption or undue delay in recreating addressing tables stored therein, and without the need for expensive and complex backup power mechanisms.

According to one aspect of the subject disclosure, a method of table journaling in a flash storage device comprising a volatile memory and a plurality of non-volatile data blocks is provided. The method comprises the steps of creating a first copy in a first one or more of the plurality of non-volatile data blocks of an addressing table stored in the volatile memory, writing transaction log data to a second one or more of the plurality of non-volatile data blocks, and updating the first copy of the addressing table based on changes to the addressing table stored in the volatile memory after the second one or more of the plurality of non-volatile data blocks have been filled with transaction log data.

According to another aspect of the subject disclosure, a flash storage device comprises a volatile memory, a plurality of non-volatile data blocks, and a controller configured to create a first copy in a first one or more of the plurality of non-volatile data blocks of an addressing table stored in the volatile memory, to write transaction log data to a second one or more of the plurality of non-volatile data blocks, and to update the first copy of the addressing table based on changes to the addressing table stored in the volatile memory after the second one or more of the plurality of non-volatile data blocks have been filled with transaction log data.

According to yet another aspect of the subject disclosure, a machine readable medium carrying one or more sequences of instructions for table journaling in a flash storage device having a volatile memory and plurality of non-volatile data blocks is provided. Execution of the one or more sequences of instructions by one or more processors causes the one or more processors to perform the steps of creating a first copy in a first one or more of the plurality of non-volatile data blocks of an addressing table stored in the volatile memory, writing transaction log data to a second one or more of the plurality of non-volatile data blocks, and updating the first copy of the addressing table based on changes to the addressing table stored in the volatile memory after the second one or more of the plurality of non-volatile data blocks have been filled with transaction log data.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
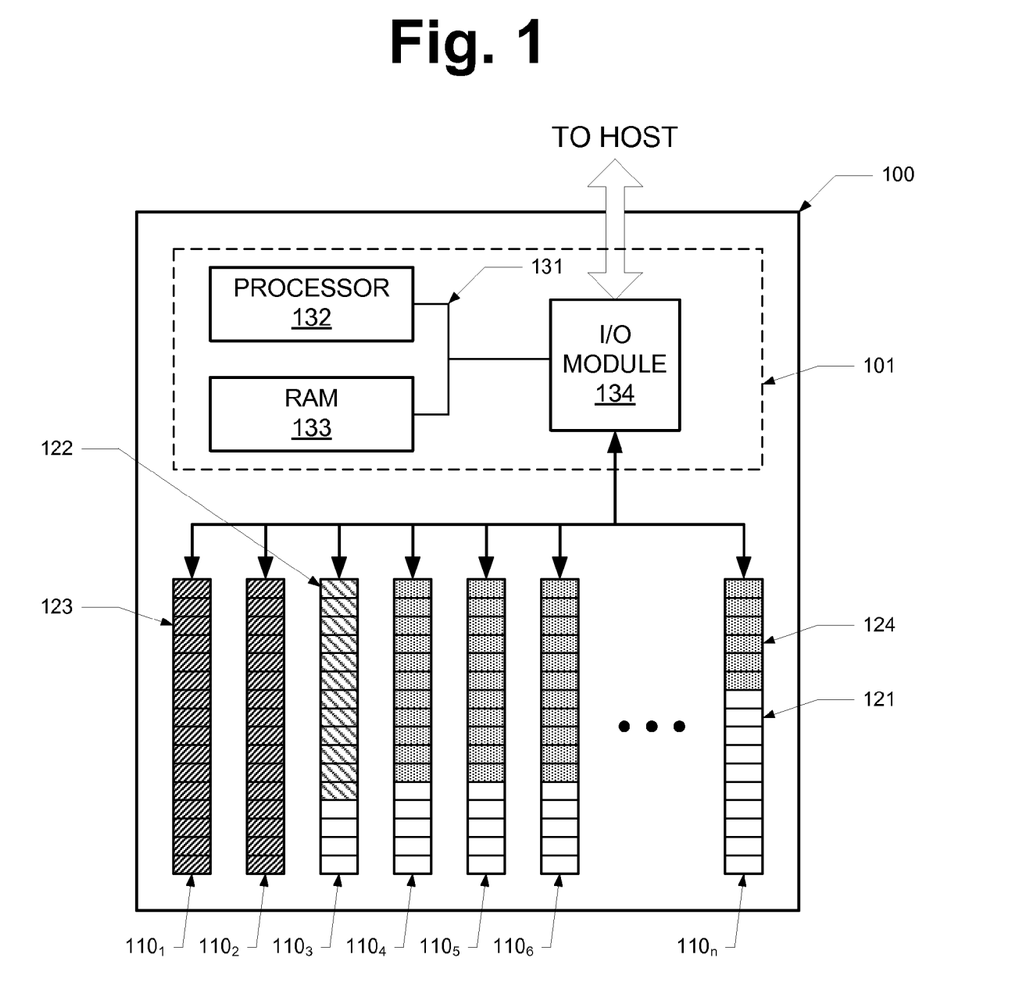
FIG. 1 illustrates a flash storage device in accordance with one aspect of the subject disclosure.

Referring to FIG. 1, a block diagram of a flash storage device according to one aspect of the subject disclosure is depicted. Flash storage device 100 includes a controller 101 and a number of non-volatile data blocks $110_1$, $110_2$, $110_3$, $110_4$, $110_5$, $110_6$ ... $110_n$. While the term "data block" is used throughout the description, it will be understood by those of skill in the art that the term data block is frequently used interchangeably with the term "memory block" in the art. Each data block has a plurality of data segments for storing data. In the present exemplary flash storage device, each data block is illustrated as including 16 data segments. The scope of the present invention, however, is not limited to such an arrangement. Rather, as will be apparent to one of skill in the art, a data block may be configured with more or less than 16 data segments as desired to provide various levels of storage space. For example, in accordance with one aspect of the subject disclosure, a data block may include 32 data segments of 4 kilobytes (kB) each to provide 128 kB of data storage. While data blocks are usually configured with $2^n$ data segments (e.g., 16, 32, 64, 128, 256, etc.), the scope of the invention is not so limited. Similarly, while each data block $110_1$-$110_n$ is illustrated as including the same number of data segments, the scope of the invention is not so limited, as a flash storage device may comprise a number of data blocks with differing capacities and/or numbers of data segments. In accordance with one aspect of the subject disclosure, a data block may span over more than one flash memory chip in a storage array of multiple chips. In accordance with another aspect, a data block is stored on a single flash memory chip in a storage array of multiple flash memory chips.

Controller 101 includes a bus 131 or other communication mechanism for communicating information, and a processor 132 coupled with bus 131 for processing information. Controller 101 also includes a volatile memory such as random access memory (RAM) 133 coupled to bus 131 for storing information and instructions to be executed by processor 132. RAM 133 may also be used for storing temporary variables or other intermediate information during execution of instructions by processor 132. According to one aspect of the subject disclosure, RAM 133 may comprise one or more DRAM or RAM modules. Controller 101 may be coupled via I/O module 134 to data blocks $110_1$-$110_n$, and to an external system with which flash storage device 100 communicates.

According to one exemplary aspect of the subject disclosure, RAM 133 may include data structures for storing information associated with each data block $110_1$-$110_n$. According to the exemplary aspect of the subject disclosure illustrated in FIG. 2, RAM 133 includes a virtual-to-physical ("V2P") addressing table 201 which correlates logical addresses used by a host device to the physical addresses of data stored in the data blocks of flash storage device 100. RAM 133 may also include a transaction log 202 which includes information about operations (e.g., reads, writes, erasures, re-writes, etc.) that flash storage device 100 has performed on data blocks $110_1$-$110_n$, and an ordered list 203 which includes information about which data blocks will be the object of an upcoming operation.

Returning to FIG. 1, four types of data segments are illustrated with different graphical conventions in FIG. 1. In particular, empty data segments, such as data segment 121, are indicated by a white field surrounded with a black line, data segments containing transaction log data (e.g., information relating to transaction log 202), such as data segment 122, are indicated by a field with light diagonal hatches surrounded by a black line, data segments containing address table data (e.g., information relating to V2P table 201), such as data segment 123, are indicated by a field with heavy diagonal hatches surrounded by a black line, and data segments containing host data (e.g., data addressable by a host device), such as data segment 124, are indicated by a shaded field surrounded by a black line.

According to one aspect of the subject disclosure, controller 101 is configured to maintain one or more copies of the data structures stored in RAM 133, such as V2P table 201 and transaction log 202, in the array of non-volatile data blocks $110_1$-$110_n$. For example, FIG. 1 illustrates an exemplary embodiment of the subject disclosure in which a copy (or "snapshot") of V2P table 201 has been copied to data blocks $110_1$ and $110_2$, as is illustrated by the data segments thereof having heavy diagonal hatches surrounded by black lines.

While in the exemplary embodiment illustrated in FIG. 1, a copy of V2P table 201 is illustrated as occupying two data blocks $110_1$ and $110_2$, the scope of the present invention is not limited to such an arrangement. Rather, as will be readily understood by those of skill in the art, any number of data blocks may be used to store a copy of a V2P table, depending upon the capacity of the data blocks and the size of the V2P table. For example, in an embodiment in which each data block is a 256 KB NAND block and in which the V2P table occupies about 150 MB of space, about 600 such NAND blocks would be required to store a copy of the V2P table.

With a snapshot copy of V2P table 201 stored in data blocks $110_1$ and $110_2$, if flash device 100 unexpectedly loses power (e.g., if flash device 100 is improperly disconnected from the host device, or if the host device itself loses power), when flash device 100 is powered back up, V2P table 201 can be more quickly recreated from the snapshot copy stored in data blocks $110_1$ and $110_2$ than if the table had to be entirely rebuilt from scratch. Nevertheless, because the copy of V2P table 201 stored in data blocks $110_1$ and $110_2$ may not contain the most recent address information (e.g., because additional operations occurred between when the snapshot was made and when power was lost), to finish rebuilding V2P table 201, controller 101 will have to scan every data block in the array to locate changes made since the snapshot of V2P table 201 was made, a process which can be time-consuming (especially for larger arrays of data blocks).

To address this drawback, controller 101 is also configured to store information from transaction log 202 in the array of non-volatile data blocks $110_1$-$110_n$. For example, FIG. 1 illustrates one exemplary embodiment of the subject disclosure in which data block $110_3$ has been pre-allocated for transaction log data. In this regard, the data segments of data block $110_3$ are incrementally filled with information from transaction log 202 as transaction log 202 grows in size. For example, when transaction log 202 accumulates an additional 4K of transaction log data (the size of the exemplary data segments in data block $110_3$), the additional 4K of transaction log data is copied to another data segment of data block $110_3$. Alternatively, rather than waiting for transaction log 202 to accumulate a certain quantity of data, controller 101 may be configured to copy information from transaction log 202 to a non-volatile data block after a certain period of time has elapsed (e.g., every 1, 5 or 10 seconds). In yet another embodiment, controller 101 may be configured to copy information from transaction log 202 to a non-volatile data block after a certain period of time or after a certain amount of data is accumulated, whichever occurs first. As can be seen with reference to exemplary FIG. 1, this operation has already been conducted 12 times (i.e., data block $110_3$ has 12 of the 16 available data segments populated with transaction log data).

While exemplary flash storage device 100 has been illustrated as pre-allocating a single data block for storage of transaction log data, the scope of the present invention is not limited to this particular arrangement. Rather, as will be readily apparent to those of skill in the art, a flash storage device may pre-allocate any number of data blocks for storing transaction log data, limited only by the total number of data blocks available and the desired addressable data storage space of the flash storage device. According to another aspect of the subject disclosure, each incremental copy of a transaction log may comprise more than one data segment, or alternatively may consume less space than is available in one data segment.

Transaction log 220 includes information about each data operation that has triggered a change to V2P table 201 since the snapshot of V2P table 201 was copied to data blocks $110_1$ and $110_2$. With this information, controller 101 can more quickly rebuild V2P table 201 after a power loss, as the snapshot copy of V2P table 201 can be updated with information about the data operations that have occurred since the snapshot was taken, bringing V2P table up to nearly the state it was in when power was lost. Nevertheless, any changes made to V2P table 201 that were not recorded in a copy of transaction log 202 in data block $110_3$ (e.g., any data operation that occurred since the last 4K of transaction log data was copied to a data segment of data block $110_3$) will still not be immediately available to controller 101 when it is rebuilding V2P table 201, so each data block in the array will still have to be scanned for any changes. While fewer changes will need to be found (e.g., if each 4K increment of transaction log 202 includes 512 entries of 8 bytes each, no more than 511 transactions may need to be located in the scan), each data block in the array will still need to be scanned to locate these operations.

To address this drawback, controller 101 is also configured to copy information about pending data operations to the array of non-volatile data blocks $110_1$-$110_n$. For example, in the exemplary embodiment illustrated in FIG. 1, controller 101 may be configured to copy information from ordered list 203, which includes information about which data blocks will be the object of an upcoming operation, to data block $110_3$. To do so, controller may combine information from transaction log 202 and ordered list 203 before writing this information to a data segment in data block $110_3$. Alternatively, the information from ordered list 203 may be copied to a different data segment in data block $110_3$ than the information from transaction log 202, or to a different data block altogether.

According to one aspect of the subject disclosure, information from ordered list 203 may be copied to a non-volatile data block at the same time information from transaction log 202 is copied to a non-volatile data block (e.g., each time 4K of total information from transaction log 202 and ordered list 203 is accumulated, or every n seconds, or whichever comes first). Alternatively, information from ordered list 203 may be copied to a non-volatile data block on a separate schedule than the information from transaction log 202 (e.g., every n seconds, every time x amount of new data accumulates in ordered list 203, etc.).

With information from ordered list 203 stored in a non-volatile data block, rebuilding V2P table 201 is much simpler after an unexpected power loss. In this regard, the snapshot copy of V2P table 201 (stored in data blocks $110_1$ and $110_2$) can be updated with information about the data operations that have occurred since the snapshot was taken (stored in data block $110_3$), as set forth above. Rather than having to scan every data block in flash storage device 100 to find data operations that were not recorded in a non-volatile copy of transaction log 202, however, controller 101 can review the most recent information copied from ordered list 203 to a non-volatile data block (e.g., whether in data block $110_3$ with the transaction log data or elsewhere) to determine which data blocks need to be scanned to locate the operations completed between when the last copy of transaction log 202 was made and when the power was lost. By reducing the number of flash blocks that controller 101 needs to scan to determine this information, the amount of time required to rebuild V2P table 201 after a power loss can be dramatically reduced.

According to one aspect of the subject disclosure, in the event of an intentional power loss (e.g., when a flash storage device is powered down), the fully-updated V2P table 201 may be copied from RAM 133 to one or more non-volatile data blocks, such that the transaction log data stored in the non-volatile data blocks is no longer needed, and may optionally be erased.

According to one aspect of the subject disclosure, if the information from transaction log 202 copied to the non-volatile data blocks is allowed to accumulate indefinitely, this information will eventually consume an unacceptably large amount of the available non-volatile storage space in flash storage device 100, impacting the addressable data capacity thereof. Accordingly, in one exemplary aspect of the subject disclosure, the amount of space available to store transaction log data in the non-volatile data blocks is pre-allocated. For example, in FIG. 1, one data block $110_3$ has been pre-allocated for transaction log data. Once the pre-allocated space available for transaction log data has been filled, controller 101 may be configured to create another, updated snapshot of V2P table 201. Once an updated snapshot has been copied from RAM 133 to one or more of the data blocks $110_1$-$110_n$, the previously copied transaction log data stored in data block $110_3$ may be erased, so that new transaction log data (e.g., information from transaction log 202 reflecting structural changes to V2P table 201 that have occurred since the updated snapshot was taken) can be periodically copied thereto.

According to one aspect of the subject disclosure, creating an updated snapshot of V2P table 201 may involve copying the entire V2P table from RAM 133 to one or more pre-erased data blocks in the data block array. Alternatively, in accordance with another aspect of the subject disclosure, only those portions of V2P table 201 which have been updated since they were last copied to one of the data blocks may be updated. In this regard, when V2P table 201 requires more than one data block in which to store a snapshot (e.g., when V2P table 201 is larger than the available storage space in any one data block), each data block in which V2P table 201 is stored may be associated with an indicator in RAM 133 which indicates whether the portion of V2P table 201 stored in that data block has been changed since the snapshot was copied. For example, in an embodiment in which a V2P table of 150 MB requires 600 data blocks of 256 KB each to store a snapshot, a list containing 600 binary entries (e.g., requiring about 75 bytes of RAM) may indicate with either a 1 or a 0 whether each corresponding data block contains an outdated portion of the V2P table. Accordingly, when controller 101 creates an updated snapshot of V2P table 201, it may be configured only to copy to pre-erased data blocks those portions of V2P table 201 which correspond to the data blocks indicated as containing outdated information, leaving unchanged the data blocks which contain still-valid portions of V2P table 201. Copying only the updated portions of V2P table 201 reduces the time necessary to create an updated snapshot, and also reduces wear on the non-volatile storage blocks.

Using the exemplary embodiment of FIG. 1 for illustration, the portion of V2P table 201 in data block $110_1$ may still be entirely up-to-date when controller 101 creates an updated snapshot, while data block $110_2$ may contain an outdated portion of V2P table 201, so that controller has only to copy to a pre-erased data block the portion of V2P table 201 in RAM 133 that corresponds to data block $110_2$, in order to a pre-erased data block to create an updated snapshot of V2P table 201. After copying the updated portion to a pre-erased data block, controller 101 may be configured to mark data block $110_2$ as invalid and schedule it for an erase operation. Controller 101 may also be configured to update the indicator in RAM 133 to reflect the validity of all the portions of the updated snapshot of V2P table 201.

Figure 3:
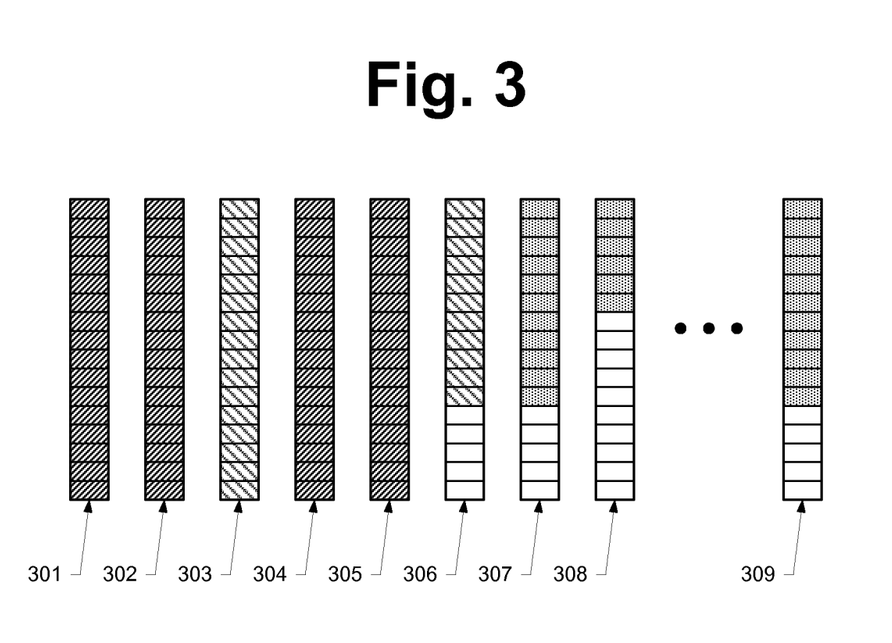
FIG. 3 illustrates an array of data blocks in accordance with one aspect of the subject disclosure.

In accordance with another aspect of the subject disclosure, multiple copies of an addressing table may be made to non-volatile data blocks in a flash storage device, to provide redundant protection in the event of an unexpected power loss. For example, FIG. 3 illustrates an array of data blocks in accordance with one aspect of the subject disclosure in which two copies of a V2P table have been stored. In this regard, data blocks 301 and 302 contain a first snapshot of a V2P table, and data blocks 304 and 305 contain a second snapshot of the V2P table. According to one aspect of the subject disclosure, both V2P table snapshots may be maintained (e.g., with transaction log data and information regarding pending operations) and updated simultaneously, so that in the event the data in one is corrupted, the data in the other can be used to rebuild the V2P table after an unexpected power loss. According to another aspect of the subject disclosure, however, multiple copies of a V2P table may be updated in a staggered fashion, to reduce the number of write operations needed to keep both copies updated.

Figure 2:
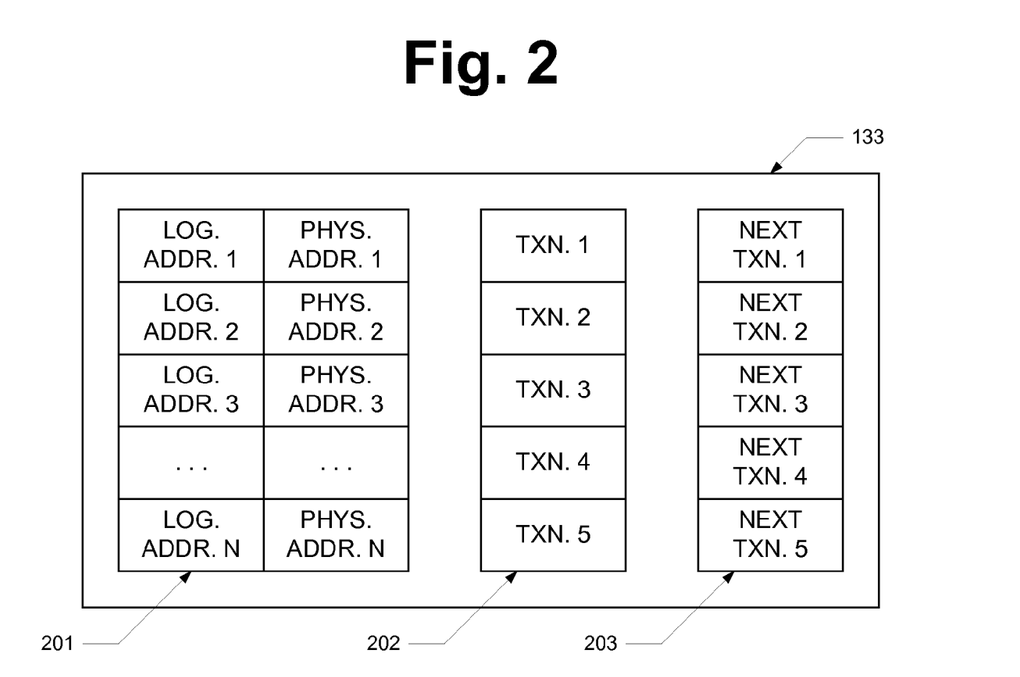
FIG. 2 illustrates data structures in accordance with one aspect of the subject disclosure.

In this regard, in accordance with one aspect of the subject disclosure, a controller of a flash storage device may be configured to create a first V2P table snapshot (e.g., in data blocks 301 and 302), as set forth in greater detail above with respect to FIGS. 1 and 2, and to maintain a first running copy of a transaction log (e.g., in data block 303) indicating changes made to the V2P table since the first snapshot (e.g., write, read, re-write, erase or other operations made to host-addressable data blocks 307-309). Once the space pre-allocated for the first transaction log in data block 303 is exhausted, rather than updating the first V2P table snapshot in data blocks 301 and 302, the controller is configured to create a second snapshot in a different portion of the non-volatile array (e.g., in data blocks 304 and 305). Moreover, rather than erasing and/or overwriting the first transaction log in data block 303, a second running copy of the transaction log is created in data block 306, where changes made to the V2P table since the second snapshot are recorded. Once the space allocated to the second snapshot is exhausted, the controller may be configured to update the first snapshot in data blocks 301 and 302, and to erase and/or overwrite the first transaction log in data block 303, and so on as each transaction log becomes full in turn. In this manner, at any point in time after both snapshots have been made, the array of non-volatile data blocks will contain a first complete V2P table snapshot from a first point in time, a second complete V2P table snapshot from a later point in time, a complete transaction log indicating the changes between when the first V2P table snapshot and the second V2P table snapshot were made, and a partial transaction log indicating the changes made to the V2P table in volatile memory since the second V2P table snapshot was made.

With multiple copies of a V2P table stored in non-volatile data blocks, the chance that a V2P table will have to be rebuilt from scratch due to a data error in the snapshots is dramatically reduced. In this regard, a flash storage device with multiple copies of a V2P table stored in non-volatile data blocks may rebuild the V2P table after a power loss as follows. First, the controller of the flash storage device evaluates the more recent snapshot of the V2P table and, if it determines there is no error therein, the more recent snapshot is updated with the information in the more recent transaction log (as set forth in greater detail above), and the data blocks indicated as being the objects of data operations that were not stored in the copy of the transaction log in the non-volatile data blocks are scanned to finish the rebuilding process (as set forth in greater detail above). If, however, the controller determines that the more recent copy of the V2P table contains an error (e.g., if it fails a CRC check, or has insufficient ECC data to recover from a read error), the controller can then begin the rebuilding process with the earlier copy of the V2P table, make the necessary changes indicated in both the earlier transaction log (indicating structural changes to the table made between the time of the first and second snapshots) and in the later, incomplete transaction log, and scan the necessary data blocks to finish rebuilding the table.

According to one aspect of the subject disclosure, in the event of an intentional power loss (e.g., when a flash storage device is powered down), multiple identical snapshots of the fully-updated V2P table may be copied from RAM to one or more non-volatile data blocks, such that the transaction log data stored in the non-volatile data blocks is no longer needed, and may optionally be erased.

While in the foregoing exemplary embodiment, a flash storage device has been described with reference to two copies of a V2P table being maintained in non-volatile data blocks, the scope of the present invention is not limited to this particular arrangement. Rather, as will be readily apparent to those of skill in the art, any number of redundant copies of a V2P table may be stored in non-volatile data blocks, limited only by the total available data blocks and the desired addressable data storage space of the device. Moreover, in accordance with one aspect of the subject disclosure, a flash storage device may contain both mirrored and staggered snapshots of a V2P table for additional redundancy (e.g., a total of four snapshots, two of an earlier state, two of a later state, with four corresponding transaction logs indicating structural changes to each of the V2P table snapshots).

Similarly, while in the foregoing exemplary embodiments, flash storage devices have been illustrated in which only one copy of a transaction log is kept for each addressing table snapshot, the scope of the present invention is not limited to this particular arrangement. Rather, as will be readily apparent to those of skill in the art, multiple copies of each transaction log (i.e., the transaction log corresponding to a given V2P snapshot) may be stored in non-volatile data blocks. In this regard, multiple copies of a transaction log may be stored in separate data blocks and/or in separate channels, to reduce the chance that the transaction log data may be unreadable (e.g., if one copy of a transaction log is unreadable, a second copy may be used to recover the transaction log data).

While in the foregoing exemplary embodiments, flash storage devices have been described as journaling V2P addressing tables in non-volatile data blocks, the scope of the present invention is not limited to these particular arrangements. Rather, as will be readily apparent to one of skill in the art, an addressing table may be any table stored in volatile memory that includes information about physical and/or logical addresses maintained by the flash storage device. For example, the term "addressing table" may include such structures as V2P addressing tables, wear leveling tables (e.g., tables containing information about a number of write operations, erase operations, or read operations performed on a given data block), or any other table containing information about the data blocks in a flash storage device.

Figure 4:
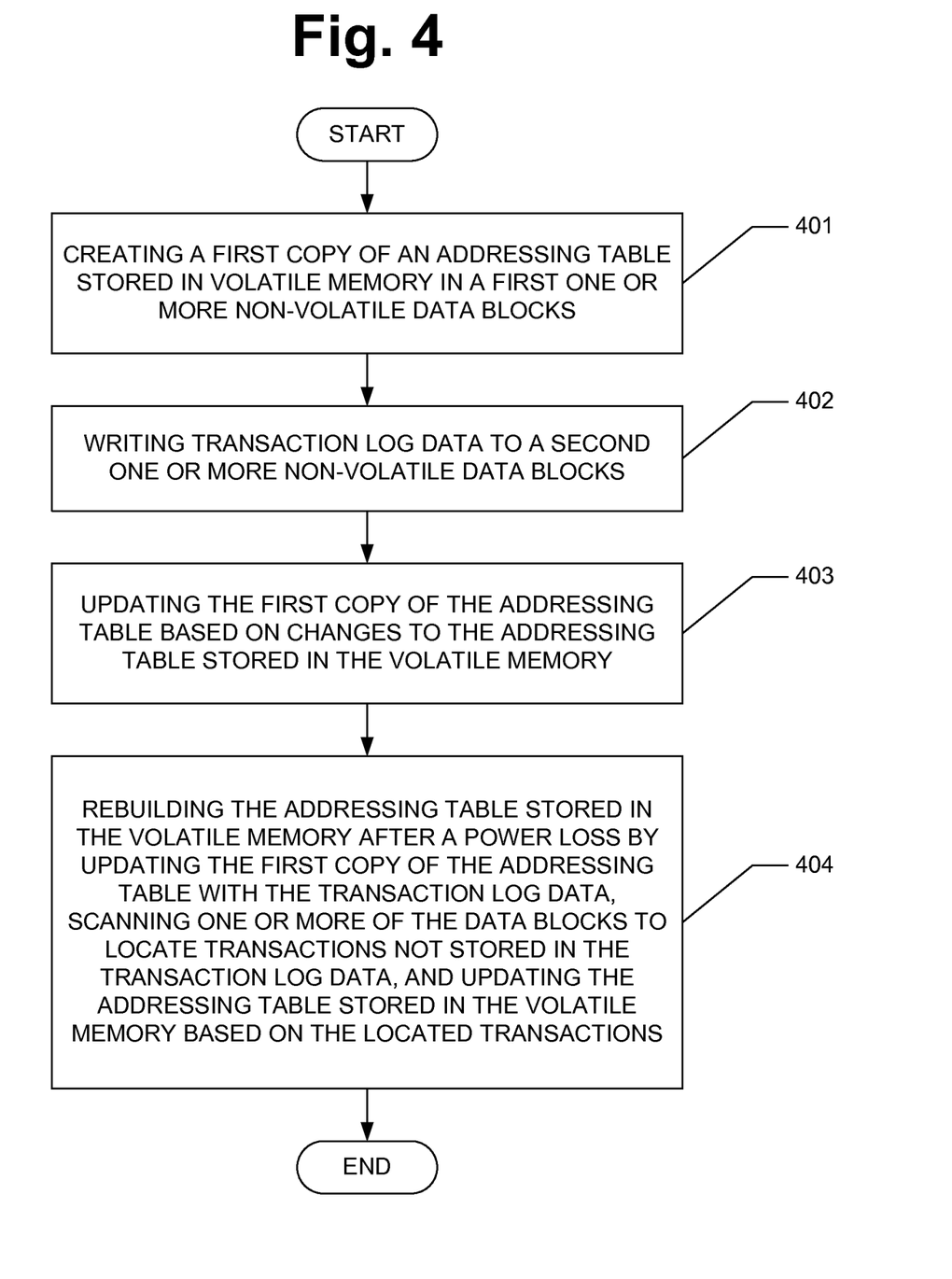
FIG. 4 is a flow chart illustrating a method of table journaling in a flash storage device in accordance with one aspect of the subject disclosure.

FIG. 4 is a flow chart illustrating a method of wear leveling in a flash storage device having a volatile memory and a plurality of non-volatile data blocks, in accordance with one aspect of the subject disclosure. The method begins with step 401, in which a first copy of an addressing table stored in the volatile memory is created in a first one or more of the plurality of non-volatile data blocks. In step 402, transaction log data is written to a second one or more of the plurality of non-volatile data blocks. In step 403, the first copy of the addressing table is updated based on changes to the addressing table stored in the volatile memory. In step 404, the addressing table stored in the volatile memory is rebuilt after a power loss by updating the first copy of the addressing table with the transaction log data, scanning one or more of the data blocks to locate transactions not stored in the transaction log data, and updating the addressing table stored in the volatile memory based on the located transactions after the second one or more of the plurality of non-volatile data blocks have been filled with transaction log data.

Figure 5:
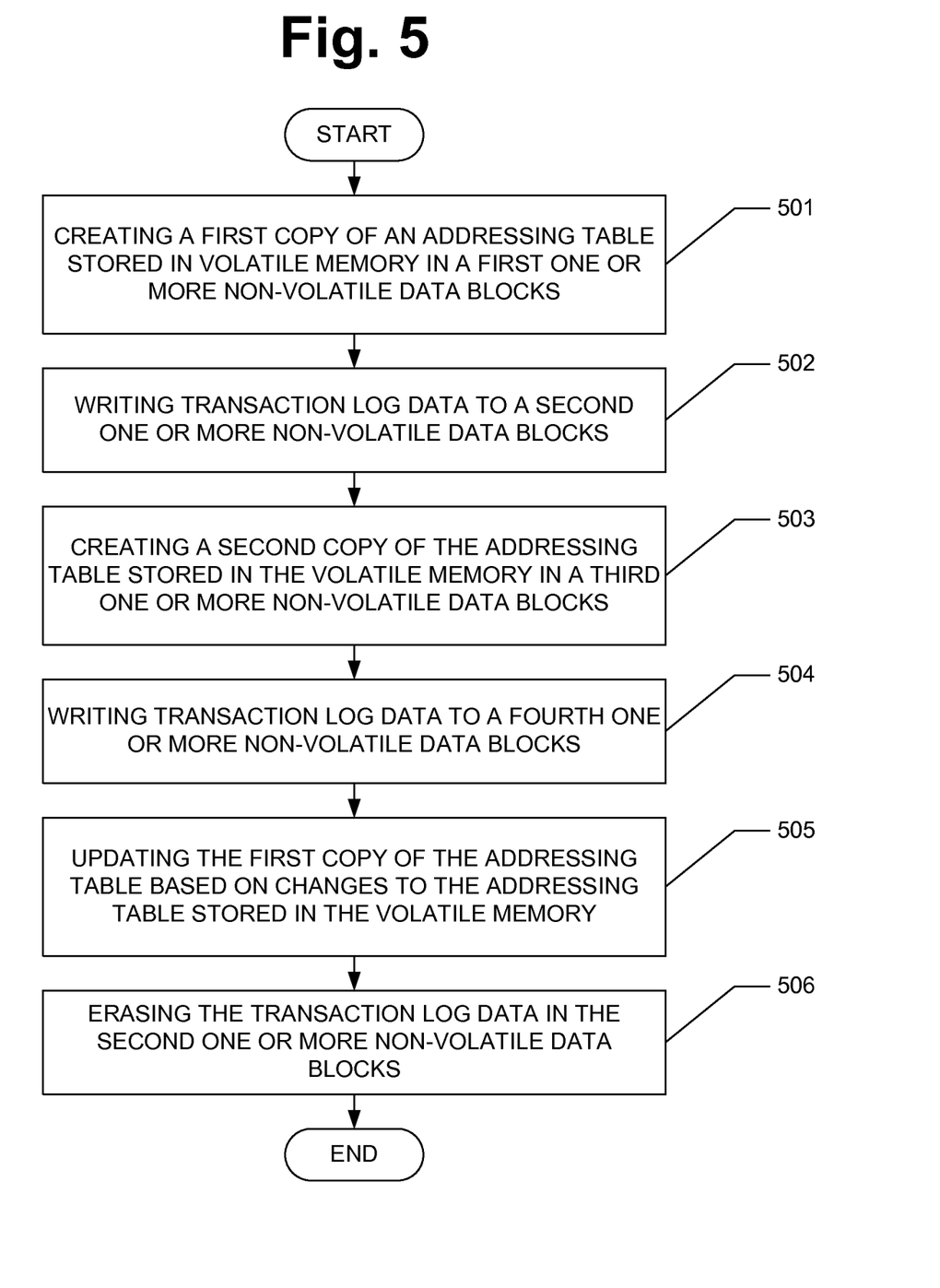
FIG. 5 is a flow chart illustrating a method of table journaling in a flash storage device in accordance with another aspect of the subject disclosure.

FIG. 5 is a flow chart illustrating a method of wear leveling in a flash storage device having a volatile memory and a plurality of non-volatile data blocks, in accordance with one aspect of the subject disclosure. The method begins with step 501, in which a first copy of an addressing table stored in the volatile memory is created in a first one or more of the plurality of non-volatile data blocks. In step 502, transaction log data is written to a second one or more of the plurality of non-volatile data blocks. In step 503, a second copy of the addressing table stored in the volatile memory is created in a third one or more of the plurality of non-volatile data blocks. Transaction log data is written in step 504 to a fourth one or more of the plurality of non-volatile data blocks. In step 505, the first copy of the addressing table is updated based on changes to the addressing table stored in the volatile memory after the fourth one or more of the plurality of non-volatile data blocks have been filled with transaction log data. In step 506, the transaction log data in the second one or more non-volatile data blocks is erased.

Returning to FIG. 1, table journaling in a flash storage device may be performed by controller 101 in response to processor 132 executing one or more sequences of one or more instructions contained in a machine-readable media, such as RAM 133, or another volatile or non-volatile media, according to one aspect of the present invention. Such instructions may be read into the machine-readable media from another medium, such as through I/O module 134. Execution of the sequences of instructions contained in the machine-readable media causes processor 132 to perform the process steps described herein. One or more processors in a multi-processing arrangement may also be employed to execute the sequences of instructions contained in the machine-readable media. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 132 for execution. Such a medium may take many forms, including, but not limited to, non-volatile media, volatile media, and transmission media. Non-volatile media include, for example, optical or magnetic disks. Volatile media include dynamic memory, such as RAM 133. Transmission media include coaxial cables, copper wire, and fiber optics, including the wires that comprise bus 131. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of table journaling in a flash storage device comprising a volatile memory and a plurality of non-volatile data blocks, the method comprising the steps of:

creating a first copy, in a first one or more of the plurality of non-volatile data blocks, of an addressing table stored in the volatile memory;

maintaining, for each of the first one or more non-volatile data blocks, a respective indicator in the volatile memory for indicating whether a portion of the addressing table stored in the non-volatile data block has been changed since the portion was last stored in the non-volatile data block;

writing, based on a first schedule, transaction log data to a second one or more of the plurality of non-volatile data blocks, wherein the transaction log data comprises information about data operations performed in at least one of the plurality of non-volatile data blocks different than the second one or more of the plurality of non-volatile data blocks;

in response to the second one or more of the plurality of non-volatile data blocks having been filled with transaction log data, updating one or more portions of the first copy of the addressing table stored in the first one or more of the non-volatile data blocks indicated in the volatile memory as being changed, the updating based on changes made to the addressing table stored in the volatile memory since the one or more portions were last stored in the non-volatile data block; and writing, to a third one or more of the plurality of non-volatile data blocks based on a second schedule separate from the first schedule, pending operation data from an ordered list indicative of blocks associated with upcoming data operations and not represented in the transaction log data.

2. The method according to claim 1, wherein the second one or more of the plurality of non-volatile data blocks are pre-allocated for transaction log data.

3. The method according to claim 1, wherein the transaction log data comprises information about a next one or more of the plurality of data blocks in which data operations are to be performed.

4. The method according to claim 1, further comprising the steps of:
creating a second copy in a third one or more of the plurality of non-volatile data blocks of the addressing table stored in the volatile memory; and
writing transaction log data to a fourth one or more of the plurality of non-volatile data blocks,
wherein the step of updating the first copy of the addressing table is performed after the fourth one or more of the plurality of non-volatile data blocks have been filled with transaction log data.

5. The method according to claim 4, further comprising the step of:
erasing the transaction log data in the second one or more of the plurality of non-volatile data blocks after updating the first copy of the addressing table.

6. The method according to claim 1, further comprising the step of:
maintaining a list indicating which of the first one or more of the plurality of data blocks contains outdated information based upon the changes to the addressing table stored in the volatile memory.

7. The method according to claim 6, wherein the step of updating the first copy of the addressing table comprises overwriting, with corresponding portions of the addressing table stored in the volatile memory, those data blocks of the first one or more of the plurality of data blocks indicated by the list as containing outdated information.

8. The method according to claim 1, further comprising the step of:
after a power loss, rebuilding the addressing table stored in the volatile memory by updating the first copy of the addressing table stored in the first one or more of the plurality of non-volatile data blocks with the transaction log data stored in the second one or more of the plurality of non-volatile data blocks.

9. The method according to claim 8, wherein the transaction log data comprises information about a next one or more of the plurality of data blocks in which data operations were to be performed before the power loss, further comprising the steps of:
scanning the next one or more of the plurality of data blocks to locate transactions not stored in the transaction log data; and
updating the addressing table stored in the volatile memory based on the located transactions.

10. A flash storage device comprising:
a volatile memory;
a plurality of non-volatile data blocks; and
a controller configured to:
create a first copy, in a first one or more of the plurality of non-volatile data blocks, of an addressing table stored in the volatile memory;
maintaining, for each of the first one or more non-volatile data blocks, a respective indicator in the volatile memory for indicating whether a portion of the addressing table stored in the non-volatile data block has been changed since the portion was last stored in the non-volatile data block;
write, based on a first schedule, transaction log data to a second one or more of the plurality of non-volatile data blocks, wherein the transaction log data comprises information about data operations performed in at least two of the plurality of non-volatile data blocks different than the second one or more of the plurality of non-volatile data blocks;
in response to the second one or more of the plurality of non-volatile data blocks having been filled with transaction log data, update one or more portions of the first copy of the addressing table stored in the first one or more of the non-volatile data blocks indicated in the volatile memory as being changed, the updating based on changes made to the addressing table stored in the volatile memory since the one or more portions were last stored in the non-volatile data block; and
write, to a third one or more of the plurality of non-volatile data blocks based on a second schedule separate from the first schedule, pending operation data from an ordered list indicative of blocks associated with upcoming data operations and not represented in the transaction log data.

11. The flash storage device according to claim 10, wherein the second one or more of the plurality of non-volatile data blocks are pre-allocated for transaction log data.

12. The flash storage device according to claim 10, wherein the transaction log data comprises information about a next one or more of the plurality of data blocks in which data operations are to be performed.

13. The flash storage device according to claim 10, wherein the processor is further configured to:
create a second copy in a third one or more of the plurality of non-volatile data blocks of the addressing table stored in the volatile memory; and
write transaction log data to a fourth one or more of the plurality of non-volatile data blocks,
wherein the controller is configured to perform the step of updating the first copy of the addressing table after the fourth one or more of the plurality of non-volatile data blocks have been filled with transaction log data.

14. The flash storage device according to claim 13, wherein the controller is further configured to:
  erase the transaction log data in the second one or more of the plurality of non-volatile data blocks after updating the first copy of the addressing table.

15. The flash storage device according to claim 10, wherein the controller is further configured to:
  maintain a list indicating which of the first one or more of the plurality of data blocks contains outdated information based upon the changes to the addressing table stored in the volatile memory.

16. The flash storage device according to claim 15, wherein the controller is configured to update the first copy of the addressing table by overwriting, with corresponding portions of the addressing table stored in the volatile memory, those data blocks of the first one or more of the plurality of data blocks indicated by the list as containing outdated information.

17. The flash storage device according to claim 10, wherein the controller is further configured to:
  after a power loss, rebuild the addressing table stored in the volatile memory by updating the first copy of the addressing table stored in the first one or more of the plurality of non-volatile data blocks with the transaction log data stored in the second one or more of the plurality of non-volatile data blocks.

18. The flash storage device according to claim 17, wherein the transaction log data comprises information about a next one or more of the plurality of data blocks in which data operations were to be performed before the power loss, and wherein the controller is further configured to:
  scan the next one or more of the plurality of data blocks to locate transactions not stored in the transaction log data; and
  update the addressing table stored in the volatile memory based on the located transactions.

19. A non-transitory machine-readable medium comprising instructions stored therein for table journaling in a flash storage device having a volatile memory and plurality of non-volatile data blocks, wherein execution of the one or more sequences of instructions by one or more processors causes the one or more processors to perform the steps of:
  creating a first copy, in a first one or more of the plurality of non-volatile data blocks, of an addressing table stored in the volatile memory;
  maintaining, for each of the first one or more non-volatile data blocks, a respective indicator in the volatile memory for indicating whether a portion of the addressing table stored in the non-volatile data block has been changed since the portion was last stored in the non-volatile data block;
  writing, based on a first schedule, transaction log data to a second one or more of the plurality of non-volatile data blocks, wherein the transaction log data comprises information about data operations performed in at least two of the plurality of non-volatile data blocks different than the second one or more of the plurality of non-volatile data blocks;
  in response to the second one or more of the plurality of non-volatile data blocks having been filled with transaction log data, updating one or more portions of the first copy of the addressing table stored in the first one or more of the non-volatile data blocks indicated in the volatile memory as being changed, the updating based on changes made to the addressing table stored in the volatile memory since the one or more portions were last stored in the non-volatile data block; and
  writing, to a third one or more of the plurality of non-volatile data blocks and based on a second schedule separate from the first schedule, pending operation data from an ordered list indicative of blocks associated with upcoming data operations and not represented in the transaction log data.

\* \* \* \* \*